United States Patent [19]
Jones

[11] Patent Number: 5,664,422
[45] Date of Patent: Sep. 9, 1997

[54] DROPPER ASSEMBLY FOR LIQUID FEED AND METHOD OF FEEDING LIQUID COMPOSITION TO A FREEZING CHAMBER

[76] Inventor: Curt D. Jones, 3 Meadow Links Dr., Paducala, Ky. 42001

[21] Appl. No.: 731,058

[22] Filed: Oct. 9, 1996

Related U.S. Application Data

[63] Continuation of Ser. No. 412,727, Mar. 29, 1995, abandoned.

[51] Int. Cl.$^6$ .................................................. F25D 17/02
[52] U.S. Cl. ............................... 62/64; 62/78; 62/373; 264/14; 264/28
[58] Field of Search ......................... 62/64, 74, 78, 62/373, 374, 375; 264/14, 28

[56] References Cited

U.S. PATENT DOCUMENTS

| | | | |
|---|---|---|---|
| 1,538,730 | 5/1925 | Obershon et al. . | |
| 1,612,167 | 12/1926 | Beardsley et al. . | |
| 2,708,055 | 5/1955 | Alexander | 222/478 |
| 2,715,484 | 8/1955 | Alexander | 222/478 |
| 2,875,588 | 3/1959 | Berger | 62/74 |
| 3,023,171 | 2/1962 | Smith | 252/359 |
| 3,060,510 | 10/1962 | Fischer et al. | 18/47.2 |
| 3,276,847 | 10/1966 | Duff et al. | 23/292 |
| 3,344,617 | 10/1967 | Rinfret et al. | 62/322 |
| 4,565,100 | 1/1986 | Malinoff | 73/863.32 |
| 5,126,156 | 6/1992 | Jones | 426/418 |
| 5,348,606 | 9/1994 | Hanaway et al. | 156/292 |

FOREIGN PATENT DOCUMENTS

| | | |
|---|---|---|
| 0 332 287 | 9/1989 | European Pat. Off. . |
| 0 641522 | 3/1995 | European Pat. Off. . |
| 55-064761 | 7/1980 | Japan . |
| 56-096667 | 10/1981 | Japan . |
| 4-091749 | 3/1992 | Japan . |
| 2 092880 | 8/1982 | United Kingdom . |

*Primary Examiner*—Ronald C. Capossela
*Attorney, Agent, or Firm*—Thomas, Kayden, Horstemeyer, & Risley, LLP

[57] ABSTRACT

A dropper assembly for feeding liquid composition to a freezing chamber comprises a tray having a plurality of feed elements that are designed to provide regulated discharge of the liquid composition from the tray and to feed the liquid composition into the freezing chamber in uniformly sized drops. The feed elements each comprise a projection that is downwardly disposed in relation to the tray. The tray has a bottom wall with a plurality of orifices, each orifice associated with a corresponding projection. The projection has an inlet opening associated with the corresponding orifice in the tray and an outlet opening where droplets are formed and released. The dimension of the inlet opening is greater than the dimension of the outlet opening. The narrowing taper of the flow channel that extends from the inlet opening to the outlet opening promotes regulated accumulation of liquid composition to facilitate regulated discharge and formation of uniformly sized droplets. An inventive method is also provided for feeding liquid composition to a freezing chamber to form uniformly sized beads of frozen product. The inventive method utilizes the novel dropper assembly.

21 Claims, 2 Drawing Sheets

DROPPER ASSEMBLY FOR LIQUID FEED AND METHOD OF FEEDING LIQUID COMPOSITION TO A FREEZING CHAMBER

RELATED APPLICATIONS

This application is a continuation of U.S. patent application Ser. No. 08/412,727, filed Mar. 29, 1995, abandoned.

TECHNICAL FIELD

The present invention relates generally to preparing a frozen product and, more particularly, to a dropper assembly for liquid feed and a method of its use in feeding liquid composition to a freezing chamber during preparation of a free-flowing frozen alimentary dairy product.

BACKGROUND OF THE INVENTION

Sales of ice cream and frozen yogurt products have risen dramatically in recent years. The applicant herein has captured a portion of this product market through the development of a unique novelty ice cream and frozen yogurt product in the form of beads. This product, marketed under the trademark "Dippin' Dots®" and "Ice Cream of the Future®", has become very popular in specialty stores and at fairs and theme parks.

The applicant has proprietary rights in the method of preparing and storing the product pursuant to U.S. Pat. No. 5,126,156, issued Jun. 30, 1992. As is described, the patented method involves delivering flavored liquid dairy composition to a feed tray and then dripping the composition into a freezing chamber. The feed tray comprises a sieve plate having orifices formed therein. The liquid dairy composition passes through the sieve plate and forms droplets that fall into the freezing chamber.

The falling droplets of liquid composition freeze rapidly in the freezing chamber, forming solid beads of flavored ice cream or yogurt product. The frozen beads are removed from the freezing chamber and packed for distribution and later consumption.

While the sieve plate of the feed tray is adequate for facilitating the formation of the desired beads, it has been found that there is a wide range in the sizes of the frozen beads. Most detrimentally, liquid particles or specks tend to be released from the sieve plate which form frozen particles in the nature of microbeads. The frozen microbeads are not only undesirable in appearance, but also adversely affect the collection of usable product. Thus, the formation of frozen microbeads introduces inefficiency into the process of preparing the frozen beaded ice cream or yogurt product.

Accordingly, a need is identified to create a way to eliminate the formation of frozen microbeads during product manufacture. It has been determined through experimentation that a structural modification can be made to the feed tray to bring about the desired result.

SUMMARY OF THE INVENTION

It is therefore, a primary object of the present invention to provide a dropper assembly for feeding liquid composition to a freezing chamber that substantially eliminates the formation of frozen microbeads during the production of a free-flowing frozen alimentary dairy product.

It is a further object of the present invention to provide a dropper assembly that easily and efficiently handles liquid feed.

Another object of the present invention is to provide a method of feeding liquid composition to a freezing chamber with enhanced control over the size of the feed droplets to yield uniformly sized frozen beaded product.

It is an additional object of the present invention to provide a method of feeding liquid composition to a freezing chamber in the form of uniformly sized droplets whereby increased frozen product yield is achieved.

Still another object of the present invention is to facilitate production of a free-flowing frozen alimentary dairy product at a reduced cost and with increased efficiency as compared with known methods.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel dropper assembly, and a method of feeding liquid composition to a freezing chamber, that achieve the stated goals is presented. The dropper assembly and the associated method are specially directed to feeding liquid composition to a freezing chamber in order to produce uniformly sized beads of frozen product.

The dropper assembly comprises a tray that receives liquid composition from a delivery source. In a key aspect of the invention, a plurality of feed elements are associated with the tray that are specifically adapted for facilitating regulated discharge of the liquid composition from the tray and for feeding the liquid composition in uniformly sized droplets. As a result of the feeding of uniformly sized droplets to the freezing chamber, uniformly sized beads of frozen product are created.

It will be recognized by those skilled in the art that one of the key features of the invention is the design of the feed elements. More particularly, the preferred embodiment of the inventive assembly incorporates feed elements each comprising a projection associated with the tray. Each projection comprises a first end associated with an orifice formed in the tray and a second end at which uniformly sized droplets are formed and released. In order to best facilitate the delivery of the liquid composition, the projections are downwardly disposed in relation to the tray. The particular preferred embodiment of the invention has projections extending downwardly from a bottom wall of the tray.

Each projection of the inventive dropper assembly has a flow channel that extends completely therethrough from the first end to the second end. Further, each projection preferably has a tapered contour that narrows from its first end to its second end. Thus, the flow channel of each projection has an inlet opening at the first end that has a greater dimension than an outlet opening at the second end. This configuration promotes the regulated discharge of the liquid composition from the tray.

The ratio of the dimension of the inlet opening to the outlet opening is preferably in the range of substantially 2:1 to substantially 20:1. In the particular preferred embodiment, the inlet opening/outlet opening dimension ratio is substantially 12:1.

As described above, the invention herein also contemplates a method of feeding liquid composition to a freezing chamber to form uniformly sized beads of frozen product. The inventive method comprises providing a dropper assembly having feed elements capable of delivering liquid composition in uniformly sized droplets. The dropper assembly is placed above the freezing chamber and liquid composition is delivered from a source to the dropper assembly. In a final step, the dropper assembly delivers the liquid composition with regulated discharge from the dropper assembly and to the freezing chamber in uniformly sized droplets.

The preferred embodiment of the method entails utilizing the unique dropper assembly. Thus, the dropper assembly used in the inventive method comprises a tray having a plurality of feed elements for regulated discharge of the liquid composition from the tray and feeding the liquid composition in uniformly sized droplets. The particular preferred embodiment of the dropper assembly has feed elements each comprising a projection associated with the tray. The inventive method contemplates providing a dropper assembly wherein each projection comprises a first end associated with an orifice formed in the tray and a second end at which uniformly sized droplets are formed and released. As described above, the projections are preferably downwardly disposed in relation to the tray and most desirably, extend downwardly from a bottom wall of the tray.

In order to facilitate the delivery of uniformly sized droplets in the method, each projection has a flow channel that extends completely therethrough from the first end to the second end. Since each projection in the preferred embodiment has a tapered contour that narrows from the first end to the second end, the flow channel thereof has an inlet opening at the first end of a larger dimension than an outlet opening at the second end. The dimension ratio of the inlet opening to the outlet opening is desirably in the range of substantially 2:1 to substantially 20:1 and, most preferably, at substantially 12:1. Furthermore, it has been found that uniformly sized droplets are released from an outlet opening having a diameter of substantially 0.03125 inches.

Still other objects of the present invention will become apparent to those skilled in this art from the following description wherein there is shown and described a preferred embodiment of this invention, simply by way of illustration of one of the modes best suited to carry out the invention. As will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing, incorporated in and forming a part of the specification, illustrates several aspects of the present invention and together with the description, serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
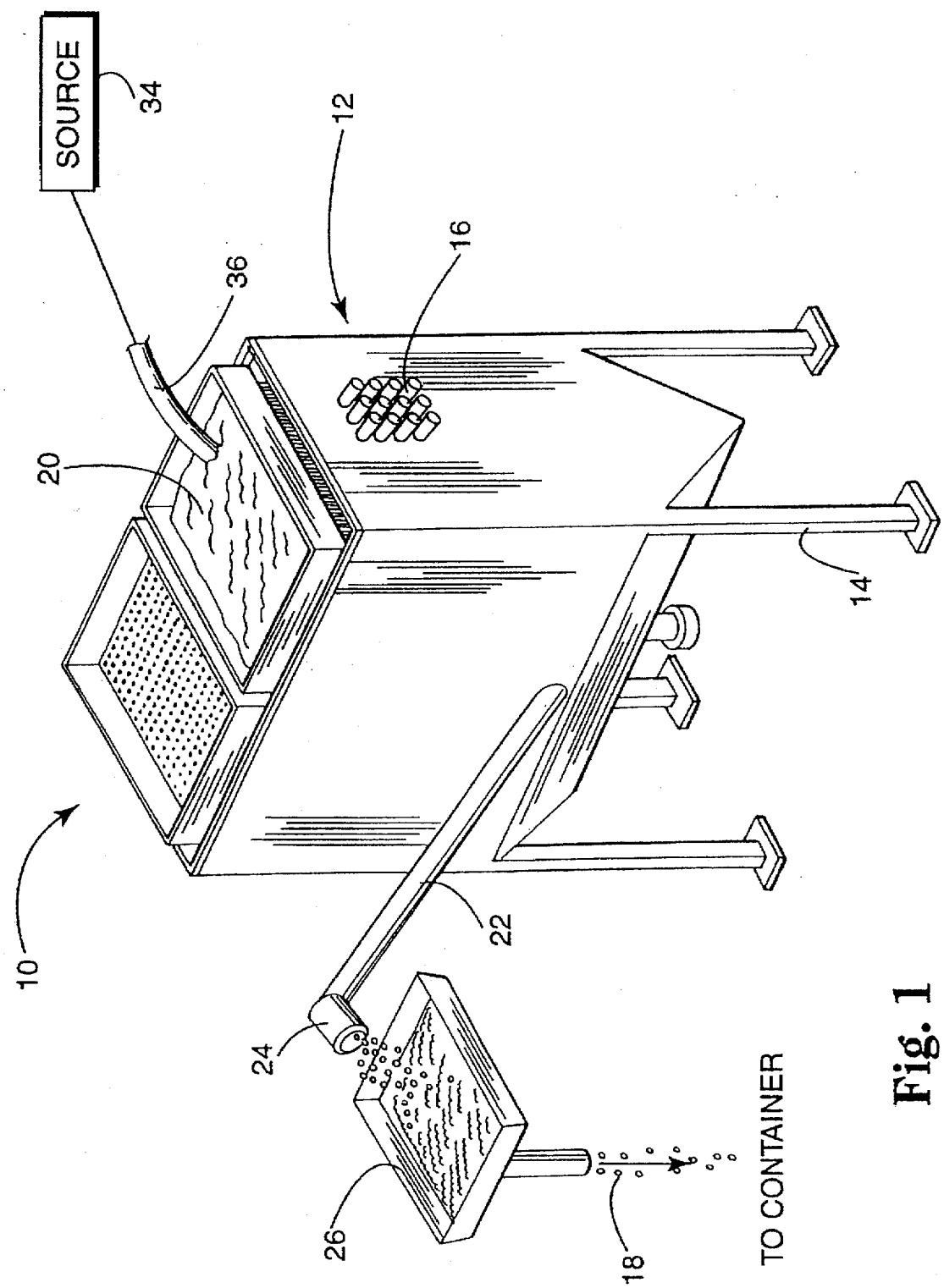
FIG. 1 is a perspective view of a pair of dropper assemblies positioned above a freezing chamber, and showing the final product of uniformly sized frozen beads.

Reference is now made to FIG. 1 showing in perspective the components that are utilized to produce free-flowing, frozen alimentary dairy products in the form of small beads. The fundamental method utilized to produce the product is described in U.S. Pat. No. 5,126,156. The apparatus illustrated in the '156 patent is merely an example of a design that is adapted to produce the frozen beaded product. The apparatus is depicted in FIG. 1 with the inventive dropper assembly 10 that enhances the efficiency of the production process and increases product yield as described below.

The production apparatus includes a freezing chamber 12 that is most preferably in the form of a tank that holds a refrigerant therein. Liquid nitrogen is the preferred refrigerant in view of its known freezing capabilities. The freezing chamber 12 is shown as a free-standing unit supported by legs 14. Alternatively, the freezing chamber 12 may be disposed in a frame that is specially built to support it while in use.

Vents 16 are provided to exhaust the gaseous nitrogen as it evaporates from the surface of the liquid so that excessive pressure is not built up within the chamber 12. Nitrogen vapor may also escape around the dropper assembly 10 when it does not completely cover the freezing chamber 12.

As is described in the '156 patent, the frozen alimentary dairy product takes the form of beads that are formed when droplets of liquid composition, enumerated as 20 in the rightmost dropper assembly 10, contact the nitrogen vapor, and subsequently the liquid nitrogen in the freezing chamber 12. After the beads 18 are formed, they fall to the bottom of the chamber 12. An auger operates within a shaft 22 to carry the beads 18 upward to a chute 24. The beads 18 pass through the chute 24 to a collecting pan 26. The collecting pan 26 then delivers the beads 18 to packaging equipment and subsequently to storing containers for later delivery and consumption.

The inventive dropper assembly 10 facilitates efficient formation of frozen beaded product for ultimate use. The dropper assembly 10 preferably comprises a tray 28 having a bottom wall 30 and side walls 32a, 32b, 32c, 32d. The side walls 32a, 32b, 32c, 32d form an enclosure for receiving the liquid composition 20 from a source 34. Typically, a pump (not shown) drives the liquid composition through a delivery tube 36 into the tray 28. The liquid composition 20 is fed to the freezing chamber 12 as is more fully discussed below.

FIG. 1 illustrates two substantially similar dropper assemblies 10 positioned above the freezing chamber 12. These dropper assemblies 10 are shown as having a rectangular configuration and extending completely across the top of the freezing chamber 12 along its minor dimension. It will be understood by those skilled in the art that an assembly 10 having a very large tray 28 may be constructed to cover the entirety of the freezing chamber 12 or, alternatively, smaller trays may be manufactured and placed side by side as shown in FIG. 1.

It is recognized that in order to create uniformly sized beads 18 of frozen product, uniformly sized droplets 38 of liquid composition 20 are required to be fed to the freezing chamber 12. The tray 28 is designed with feed elements 40 that form droplets 38 of the desired character.

Figure 2:
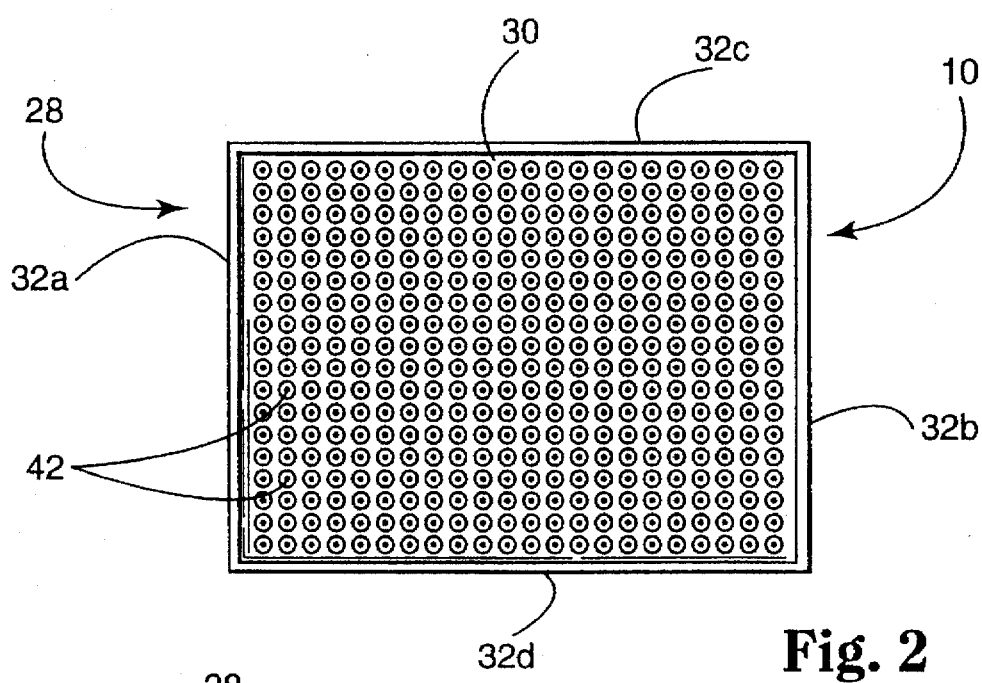
FIG. 2 is a top view of the inventive dropper assembly.

As best shown in the preferred embodiment of FIG. 2, the bottom wall 30 of the tray 28 is formed with a plurality of orifices 42. Preferably, the orifices 42 are in an ordered array of rows and columns. It is thus perceived that the liquid composition 20 flows into and through the orifices 42 in the direction of the freezing chamber 12 during the production process.

Figure 3:
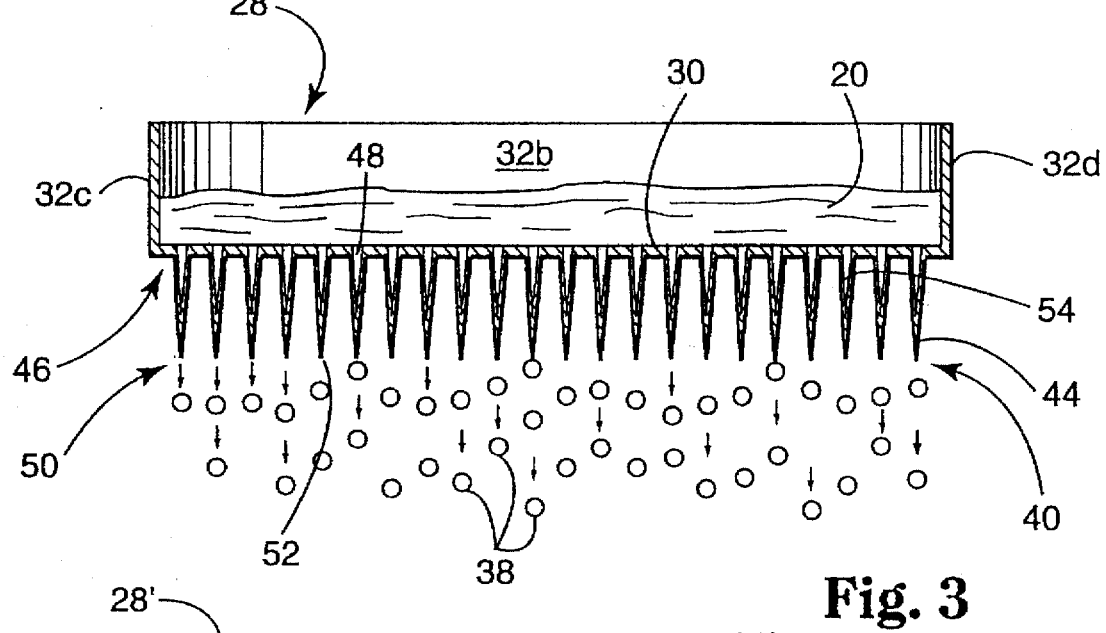
FIG. 3 is a side view of the dropper assembly showing the downwardly disposed projections delivering uniformly sized droplets of liquid composition.

In a key aspect of the invention, the dropper assembly 10 is formed with projections 44 that are associated with the tray 28 (see FIG. 3). More particularly, the preferred embodiment of the invention is designed with a separate projection 44 cooperating with each individual orifice 42 formed in the bottom wall 30 of the tray 28. The projections 44 preferably extend downwardly from the bottom wall 30 of the tray 28 toward the freezing chamber 12. Each projection 44 thus has, at its first end 46, an inlet opening 48 that is in communication with the associated orifice 42 and, at its second end 50, an outlet opening 52.

A flow channel 54 extends the entire length of each projection 44 from the inlet opening 48 to the outlet opening 52. The projections 44 preferably taper to become narrower toward its second end 50. It follows then that the inlet opening 48 has a larger dimension than the outlet opening 52. The narrowing of the flow channel 54 promotes regulated accumulation of the liquid composition 20 and thus promotes regulated discharge of the liquid composition from the tray 28. The design further allows a droplet 38 to be formed in orderly fashion until the net gravity force overcomes the interfacial tension forces on the droplet and it falls toward the freezing chamber 12.

The flow rate of the liquid composition 20 through the flow channel 54 is a factor in the orderly formation of droplets 38 at the second end 50 of the projection 44. The flow rate is a function of, among other things, the dimensions of the inlet opening 48 and the outlet opening 52. It has been determined that uniformly sized droplets 38 form and are released from the projection 44 when the ratio of the dimension of the inlet opening 48 to the outlet opening 52 is in the range of substantially 2:1 to substantially 20:1. In the particular preferred embodiment of the invention, the inlet opening 48 has a diameter of substantially 0.375 inches and the outlet opening 52 has a diameter of substantially 0.03125 inches. Thus, the dimension ratio of the particular preferred embodiment is substantially 12:1.

The tray 28 and projections 44 are preferably made of durable food grade plastic or stainless steel and may be formed together during original manufacture. Alternatively, the projections 44 may be later connected to the tray 28 at associated orifices 42. Pipette tips may be used as the projections 44 integrated with the tray 28 in this instance. The pipette tips of the plastic type may be purchased from instrument distributors such as Cole-Parmer® Instrument Company of Chicago, Ill.

Figure 4:
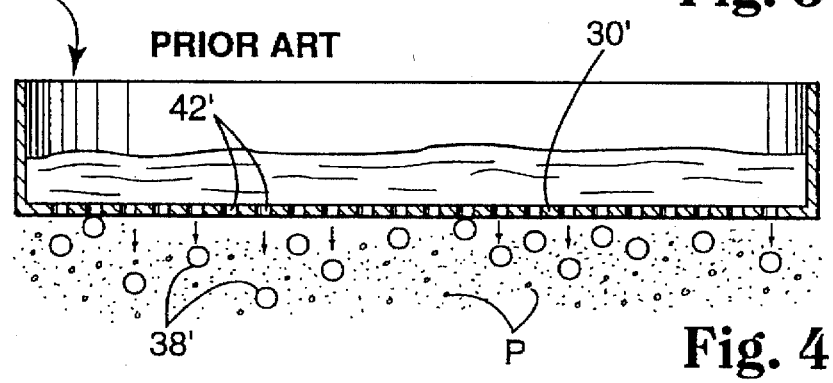
FIG. 4 is a side view of a prior art design of a feeding tray.

The principal advantages of the inventive dropper assembly 10 are best recognized by comparison with the prior art, an enlarged illustration of which is presented in FIG. 4. Using the prime identifier as a superscript for components similar to those used in the inventive assembly 10, prior art apparatus have a tray 28' in which orifices 42' are formed in the bottom surface 30'. Droplets 38' are formed and released directly from the orifices 42' under the force of gravity. There is no opportunity for regulated accumulation of liquid composition 20' and thus spattering frequently occurs upon release of a droplet 38' from the orifice 42' of the tray 28'. Furthermore, some droplets 38' released from the orifices 42' are so unstable that they break apart into smaller droplets, creating droplets of widely varying sizes and also resulting in further spattering.

The very small beads distract from the unique and pleasing appearance of the desirably sized beads and thus it is necessary to eliminate them from the final product. This has been accomplished in prior art designs with the use of a sieve in combination with a shaker that has been associated with the collecting pan (see '156 patent).

Furthermore, the spattering created during droplet release and/or break-up generates minute particles P that also fall into the freezing chamber and form particles of frozen microbeads that accumulate at the bottom thereof. This creates the need to shut the production process down to clean out the freezing chamber. Furthermore, the frozen microbeads represent waste, which obviously decreases efficient operation and production.

Numerous benefits result from the use of the inventive dropper assembly 10 and the method of feeding liquid composition to a freezing chamber using the assembly. In contrast to prior art designs, the projections 44 of the present invention promote the regulated discharge of the liquid composition from the tray 28 and the formation of uniformly sized droplets 38 of liquid composition 20 that, when delivered to the freezing chamber 12, form uniformly sized beads 18 of frozen product. The use of the novel dropper assembly 10 eliminates the need for the filtering requirement, and thus the sieve/shaker components and the power utilized to operate the shaker are eliminated. In addition, the projections 44 prevent the spattering of minute particles of liquid composition 20 and thus prevents the formation of frozen dust that has previously accumulated at the bottom of the freezing chamber 12.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A dropper assembly for feeding liquid composition to a freezing chamber, comprising:

a tray overlying a freezing chamber and disposed to receive liquid composition from a delivery source, said tray having a bottom wall with a plurality of orifices through which the received liquid composition is directed; and a plurality of uniformly tapered feed elements associated with said tray and disposed for regulated discharge of said liquid composition from said tray and for feeding said liquid composition by gravity only to said freezing chamber in uniformly sized droplets, each of said plurality of feed elements being aligned in fluid communication with one of said plurality of orifices in said bottom wall of said tray, whereby uniformly sized droplets of liquid composition are delivered by gravity to said underlying freezing chamber.

2. The dropper assembly as in claim 1, wherein said feed elements each comprise a projection associated with said tray.

3. The dropper assembly as in claim 2, wherein said projection is downwardly disposed in relation to said tray.

4. The dropper assembly as in claim 2, wherein each said orifice is associated with a corresponding projection.

5. The dropper assembly as in claim 4, wherein said projection has a first end associated with said corresponding orifice and a second end spaced from said first end.

6. The dropper assembly as in claim 5, wherein said projection has an inlet opening associated with said first end and an outlet opening associated with said second end.

7. The dropper assembly as in claim 6, wherein said projection has a uniformly tapered flow channel extending from said inlet opening to said outlet opening.

8. The dropper assembly as in claim 7, wherein the ratio of the dimension of the inlet opening to the dimension of the outlet opening is in the range of substantially 2:1 to substantially 20:1.

9. The dropper assembly as in claim 7, wherein the ratio of the dimension of the inlet opening to the dimension of the outlet opening is substantially 12:1.

10. The dropper assembly as in claim 7, wherein the dimension of said outlet opening is substantially 0.03125 inches.

11. A method of feeding liquid composition to a freezing chamber containing a refrigerant to form uniformly sized beads of frozen product, comprising the steps of:

provisioning a dropper assembly having a plurality of uniformly tapered feed elements configured to discharge said liquid composition in uniformly sized droplets;

placing said dropper assembly directly above said freezing chamber;

delivering said liquid composition from a source to said dropper assembly, where said liquid composition is directed into said plurality of feed elements;

delivering said liquid composition from said dropper assembly by gravity only to said freezing chamber with regulated discharge and in uniformly sized droplets; and contacting said uniformly sized droplets with said refrigerant for freezing said droplets into uniformly sized frozen beads of product.

12. The method as in claim 11, wherein said dropper assembly comprises a tray having a plurality of feed elements for regulated discharge of said liquid composition from said tray and for feeding said liquid composition in uniformly sized drops.

13. The method as in claim 12, wherein said feed elements each comprise a projection associated with said tray.

14. The method as in claim 13, wherein said projection is downwardly disposed in relation to said tray.

15. The method as in claim 13, wherein said tray comprises a plurality of orifices formed in a bottom wall, each orifice associated with a corresponding projection.

16. The method as in claim 15, wherein said projection has a first end associated with said corresponding orifice and a second end spaced from said first end.

17. The method as in claim 16, wherein said projection has an inlet opening associated with said first end and an outlet opening associated with said second end.

18. The method as in claim 17, wherein said projection has a uniformly tapered flow channel extending from said inlet opening to said outlet opening.

19. The method as in claim 18, wherein the ratio of the dimension of the inlet opening to the dimension of the outlet opening is in the range of substantially 2:1 to substantially 20:1.

20. The method as in claim 18, wherein the ratio of the dimension of the inlet opening to the dimension of the outlet opening is substantially 12:1.

21. The method as in claim 18, wherein the dimension of said outlet opening is substantially 0.03125 inches.

* * * * *